United States Patent [19]
Weathers et al.

[11] Patent Number: 6,021,601
[45] Date of Patent: Feb. 8, 2000

[54] VINE TRAINING ANCHOR

[75] Inventors: Carl Weathers, deceased, late of Gervais; by Charlene M. Weathers, legal representative, Keizer, both of Oreg.

[73] Assignee: Growers Supply Co., Inc., Toppenish, Wash.

[21] Appl. No.: 08/736,159

[22] Filed: Oct. 24, 1996

[51] Int. Cl.$^7$ .................................................. A01G 5/00
[52] U.S. Cl. ............................. 47/42; 52/155; 248/499; 248/508; 47/44
[58] Field of Search .................................. 47/42, 43, 47, 47/44; 248/499, 508, 509; 52/155

[56] References Cited

U.S. PATENT DOCUMENTS

| | | | |
|---|---|---|---|
| 904,769 | 11/1908 | Ford | 47/47 |
| 1,241,472 | 9/1917 | Adamson | 52/155 |
| 1,569,341 | 1/1926 | Varell | 52/155 |
| 1,754,534 | 4/1930 | Vought | 47/47 |
| 1,775,317 | 9/1930 | Milliken | 52/155 |
| 1,850,868 | 3/1932 | Drake | 52/155 |
| 1,916,305 | 7/1933 | Esselen | 47/47 |
| 2,004,983 | 6/1935 | Goldberg | 47/47 |
| 2,426,443 | 8/1947 | Fetterman | 52/155 |
| 2,734,727 | 2/1956 | Hensley | 52/155 |
| 2,894,706 | 7/1959 | Cappio | 47/47 |
| 3,305,984 | 2/1967 | Borcuk | 52/155 |
| 3,397,485 | 8/1968 | Peterson | 47/47 |
| 4,870,781 | 10/1989 | Jones | 47/43 |

FOREIGN PATENT DOCUMENTS

| | | | |
|---|---|---|---|
| 818137 | 10/1951 | Germany | 47/47 |
| 933282 | 8/1963 | United Kingdom | 47/47 |
| 2241143 | 8/1991 | United Kingdom | 47/43 |

*Primary Examiner*—Michael J. Carone
*Assistant Examiner*—Joanne C. Downs
*Attorney, Agent, or Firm*—Stratton Ballew PLLC

[57] ABSTRACT

An anchor comprising a curved picket is provided. The picket has a first end and a second end and an attachment element, for receiving a trainer, positioned proximate to the first end of the picket. The second end of the curved picket is penetrable into a surface of a soil or other penetrable substance, in a manner that anchors the picket. The picket penetrates the root system of the plant. The root system provides additional anchoring support for the picket and the attached trainer. A trainer is attached near the first end of the picket and a plant is trained to grow along the trainer. The anchor is a simple and inexpensive device that firmly anchors a trainer near the ground while preventing the trainer from directly contacting the ground. The anchor is more resistant to winds and erosion when compared to conventional anchors. The tension on the trainer is adjustable after the anchor is set into the soil.

10 Claims, 7 Drawing Sheets

VINE TRAINING ANCHOR

TECHNICAL FIELD

The invention relates to a method and apparatus for an improved anchoring system for trees and plants and more particularly to an improved trainer anchor for vineal plants, such as hops.

BACKGROUND OF THE INVENTION

Hops have been grown for centuries in commercial quantities for use as a chief ingredient in the production of beer. The hop plant, *Humulus lupulus L.*, is grown on a network of trellises, lattice works, poles, strings and wires that are employed for support. Hop plants typically attain heights of eighteen to twenty feet. The vertically winding vine-like or "vineal" stems of hop plants are generally referred to as bines in the hop growing industry. The predominantly horizontal branches from the main bines are called laterals. Trainers are required to ease the training of the growing and unwieldy hop vines.

The trainers for hops are conventionally fabricated from lengths of twine. The first end of a twine trainer is attached to an overhead length of wire and the second end is passed through an anchor imbedded into the ground, and then attached to the overhead length of wire. The twine trainers form a large "V", and support the growing bines of a hop plant planted at the apex of the twine "V".

Currently, the best available anchor for trainers of vine plants is a "W" type anchor. The W type anchor is a clip manufactured under the name SPREAD LOK®. The W type anchor, or W-clip, includes a W-shaped pair of prongs that are inserted under the soil to provide an anchor that is simple, inexpensive and easy to set. A disadvantage of the W-clip is that it anchors the twine trainer beneath the surface of the soil. The twine is preferably biodegradable, so that it easily composts after harvest. However, contacting the soil for an extended period causes the twine to rot and sever, undesirably releasing the growing hop bine. To avoid this problem, hop growers apply an "anti-rot" solution to the twine trainers at the soil contacting portions. This anti-rot solution is typically an organic based preservative or weak metallic salt solution that prevents the twine from decomposing.

The application of the anti-rot solution to the first end of the twine used with a W-clip is an additional, but necessary step. The application of the anti-rot solution is environmentally suspect, however, especially when the used twine is composted and redistributed into the hop field to add organic material for the next hop crop as is typically done. The anti-rot solution prevents segments of composted twine from decomposing and then leaches into the soil, creating potential trace contaminants that can accumulate in detectable levels in the growing crop.

The anti-rot solution is also expensive. At a few dollars per acre of hops, this cost quickly adds up in large crops and directly reduces profit. Moreover, a successful hop producer is always eager to trim costs and increase profitability. To maximize profit, the production of hops in large quantities demands modern growing techniques that help minimize costs while maximizing yields.

Therefore, a simple and inexpensive anchor for vineal plants is needed that firmly attaches a twine trainer near the ground while preventing the trainer from directly contacting the ground.

Additionally, the conventional W-clip pulls out of the soil quite easily, especially in high winds or when the surrounding soil is eroded or saturated by irrigation water or heavy rains.

Also, an improved hop twine anchor is needed with improved anchoring that is resistant to winds and erosion.

Another problem with the W-clips is the lack of adjustment afforded to a loop of twine attached to the clip. Once the W-clip is deeply inserted into the soil, the trainer cannot be adjusted without removing the clip.

Additionally, therefore, an improved trainer anchor is needed that allows the adjustment of tension upon the trainer after the anchor is set.

SUMMARY OF INVENTION

The present invention includes an anchor comprising a curved picket having a first end and a second end and an attachment element positioned proximate to the first end of the picket. The second end of the curved picket is penetrable into a surface of a soil or other penetrable substance, in a manner that anchors the curved picket. Additionally, the second end is positioned to point toward the surface of the soil, and the attachment element is positioned proximate to the first end of the picket and the first end is positioned above the surface of the soil. The anchor provides an attachment for a trainer. In a preferred embodiment of the invention, the picket penetrates the root system of the plant. The root system provides additional anchoring support for the picket and the attached trainer.

In a preferred method of the invention, a plant is trained by first inserting the curved picket into the soil. The first end of the curved picket is positioned above the surface of the soil and the second end of the curved picket is positioned below the surface of the soil. A trainer is attached near the first end of the picket and a plant is trained to grow along the trainer.

According to one aspect of the invention, the anchor is a simple and inexpensive device that firmly anchors a trainer to the ground while preventing the trainer from directly contacting the ground. This is especially advantageous when the trainer is formed of twine.

According to another aspect of the invention, the anchor is more resistant to winds and erosion when compared to conventional anchors.

According to another aspect of the invention, the tension on the trainer is adjustable after the anchor is set into the soil.

DETAILED DESCRIPTION OF SPECIFIC EMBODIMENTS

Figure 1:
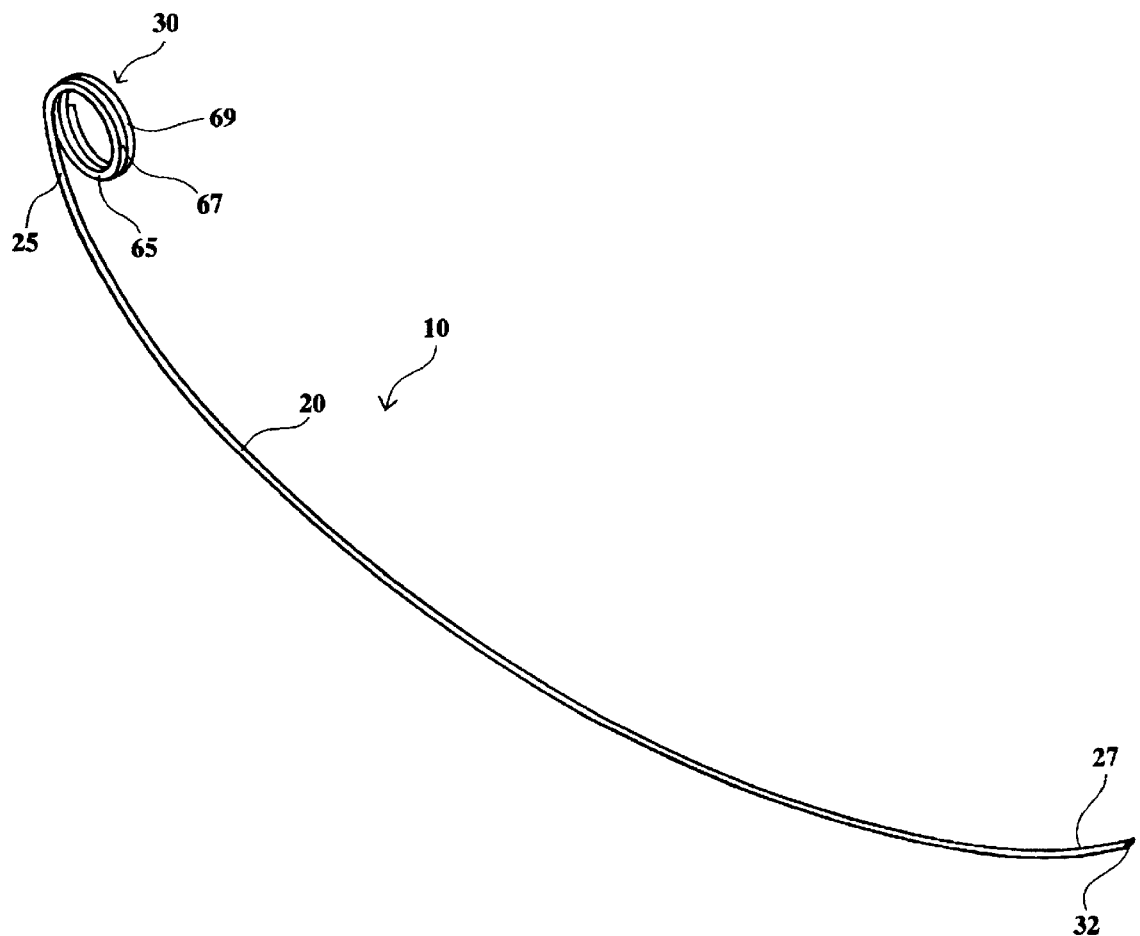
FIG. 1 is a perspective diagram of an anchor, according to an embodiment of this invention.
Figure 2:
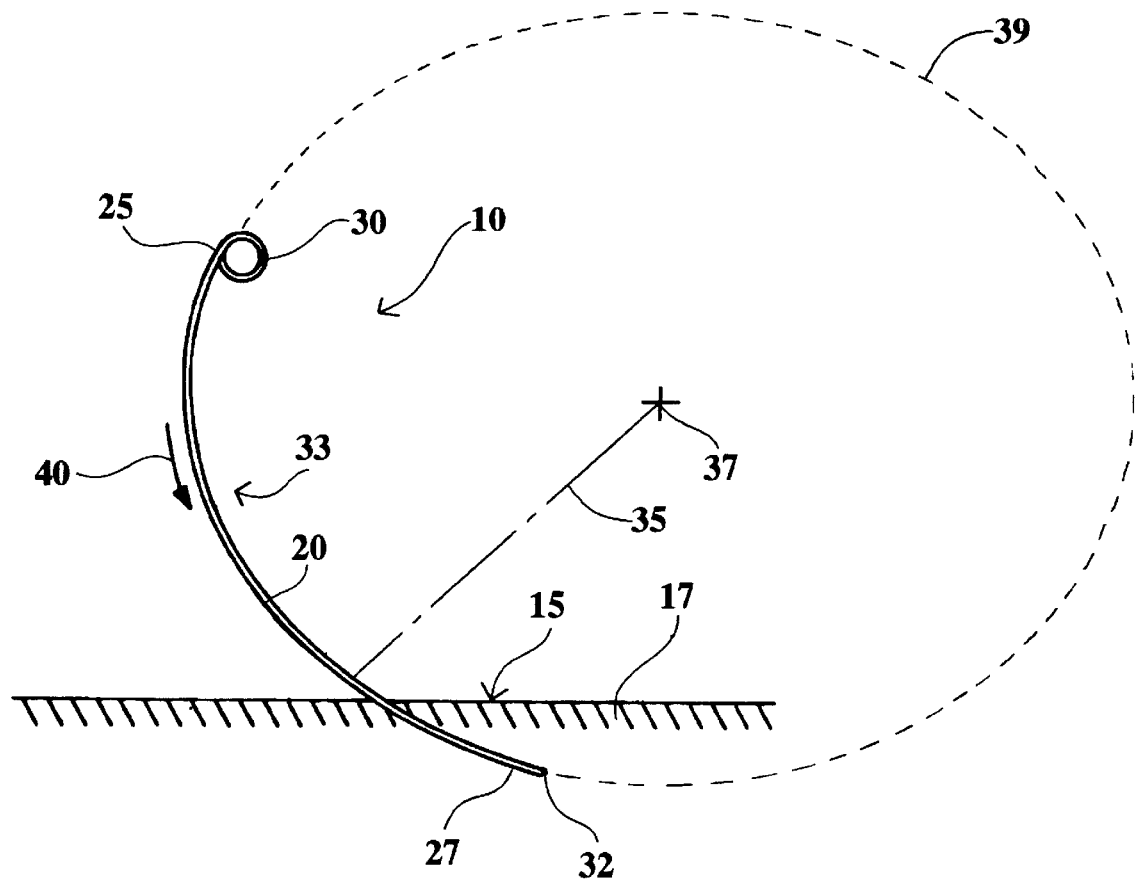
FIG. 2 is a side view of the anchor being inserted into a soil surface, according to an embodiment of the invention.

A preferred embodiment of the present invention is shown in FIG. 1. The present invention provides an anchor 10, as shown in FIG. 2, which is insertable into a surface 15. The surface is preferably the surface of a penetrable substance 17, which is preferably soil of any variety, consistency or composition. Additionally, snow and sod are considered as substances penetrable by the anchor. The anchor includes a curved picket 20. The curved picket has a first end 25 and a second end 27. The anchor also includes an attachment element 30 located proximate to the first end, while the second end preferably includes a point 32.

The anchor 10 of the present invention is preferably fabricated from a heavy gauge wire having a high tensile strength while also resistant to corrosion. Most preferably, the wire is constructed from an 11 Steel Wire Gage, stainless steel alloy. Alternatively, 11 Steel Wire Gage, steel wire, with a conventionally dipped galvanized zinc coating, performs adequately.

The picket 20 of the anchor 10 is preferably curved to form a substantially smooth arc 33 as shown in FIG. 2. The arc of the picket can be described by an averaged radius of curvature 35. A single radius of curvature (not shown) is the distance from any singular point along the picket to a center 37 of a circle 39. The circle is constructed by continuing the substantially smooth arc of the picket until it loops back to the picket. The single radius of curvature for each point along the picket can be measured and averaged over the length of the picket, from the first end to the second end, to establish an averaged radius of curvature for the picket. The radius of curvature can be varied along the length of the picket to suit the specific application of the anchor.

The substantially averaged radius of curvature 35, for the arc 33 of the picket, as defined above, is preferably within the range of three inches to twenty feet. More preferably, the averaged radius of curvature is within the range of six inches to three feet. In the most preferred embodiment of the anchor 10, the picket 20 is approximately 18 inches in length with an averaged radius of curvature of 12 inches, in that the arc of the picket approximately follows the circumference of a circle having a 12 inch radius.

The anchor 10 also includes an attachment element 30 positioned proximate to the first end 25 of the picket 20. The attachment element preferably comprises of at least a single loop at the first end of the picket. Preferably, the loop closes upon itself, similar to the winding of a conventional helical extension spring. Also preferably, the loop is a continuation of the same wire that forms the picket. Most preferably, the attachment element comprises three loops; a first loop 65, a second loop 67 and a third loop 69, as shown in FIG. 1. The three loops also preferably close upon themselves, and as with the single loop embodiment, are also similar in configuration to the windings of a conventional helical extension spring.

The second end 27 of the picket 20 is preferably pointed 32. The pointed second end allows the picket to more easily pierce the surface 15 of the penetrable substance 17, as shown in FIG. 2. The pointed second end can include a chiseled angle imparted by conventional apparatus for cutting the wire into lengths as needed for the picket. The physical qualities of the surface and of the penetrable substance below the surface, dictate the required sharpness and angularity of the second end of the picket. Hard penetrable substances, such as dry or rocky soils, require a sharp second end to adequately penetrate the surface. Soft penetrable substances, such as wet or sandy soils, typically require no special modifications of the wire after it is cut to the desired length to form the picket.

The anchor 10 inserts into the surface 15 of the penetrable substance 17, as also shown in FIG. 2. The anchor is pushed into the penetrable substance in the insertion direction 40, as also shown in FIG. 2, toward the second end 27 of the anchor, along the picket 20.

The inventor prefers to manually force the anchor 10 into the penetrable substance 17. However, devices that are automated to mechanically insert the anchor into the penetrable substance are considered as alternatives to the manual insertion of the anchor.

Figure 3:
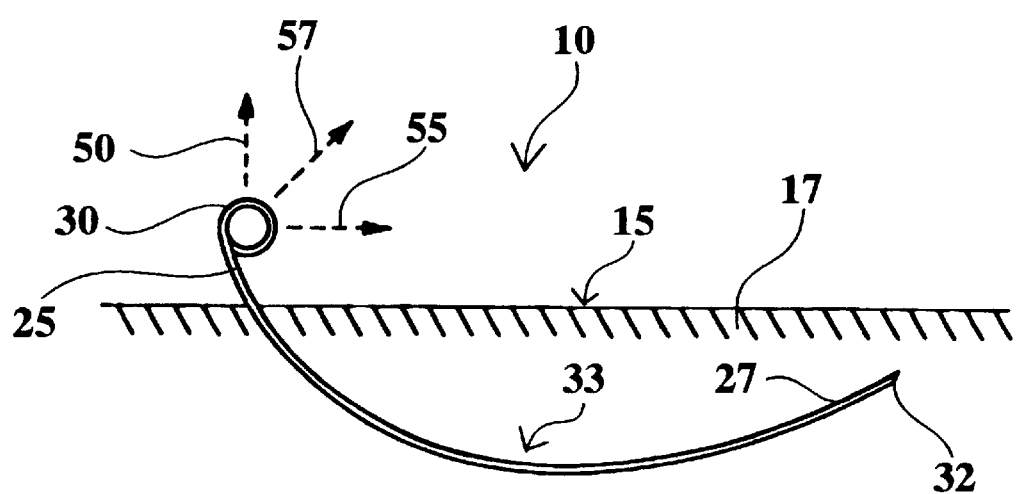
FIG. 3 is a side view of the anchor inserted into a soil surface, according to an embodiment of the invention.

The anchor 10 is inserted into the penetrable substance 17, preferably in a configuration as shown in FIG. 3, with the first end 25 of the curved picket 20 positioned above the surface 15 of the penetrable substance. Again, the penetrable substance preferably comprises soil. The point 32 of the picket is preferrably positioned below the surface of the soil, and most preferably is directed approximately upward toward the surface. However, the inventor also considers positioning the picket in a more vertical orientation or in an orientation that allows the point to penetrate through the surface, exposing the point.

Figure 4:
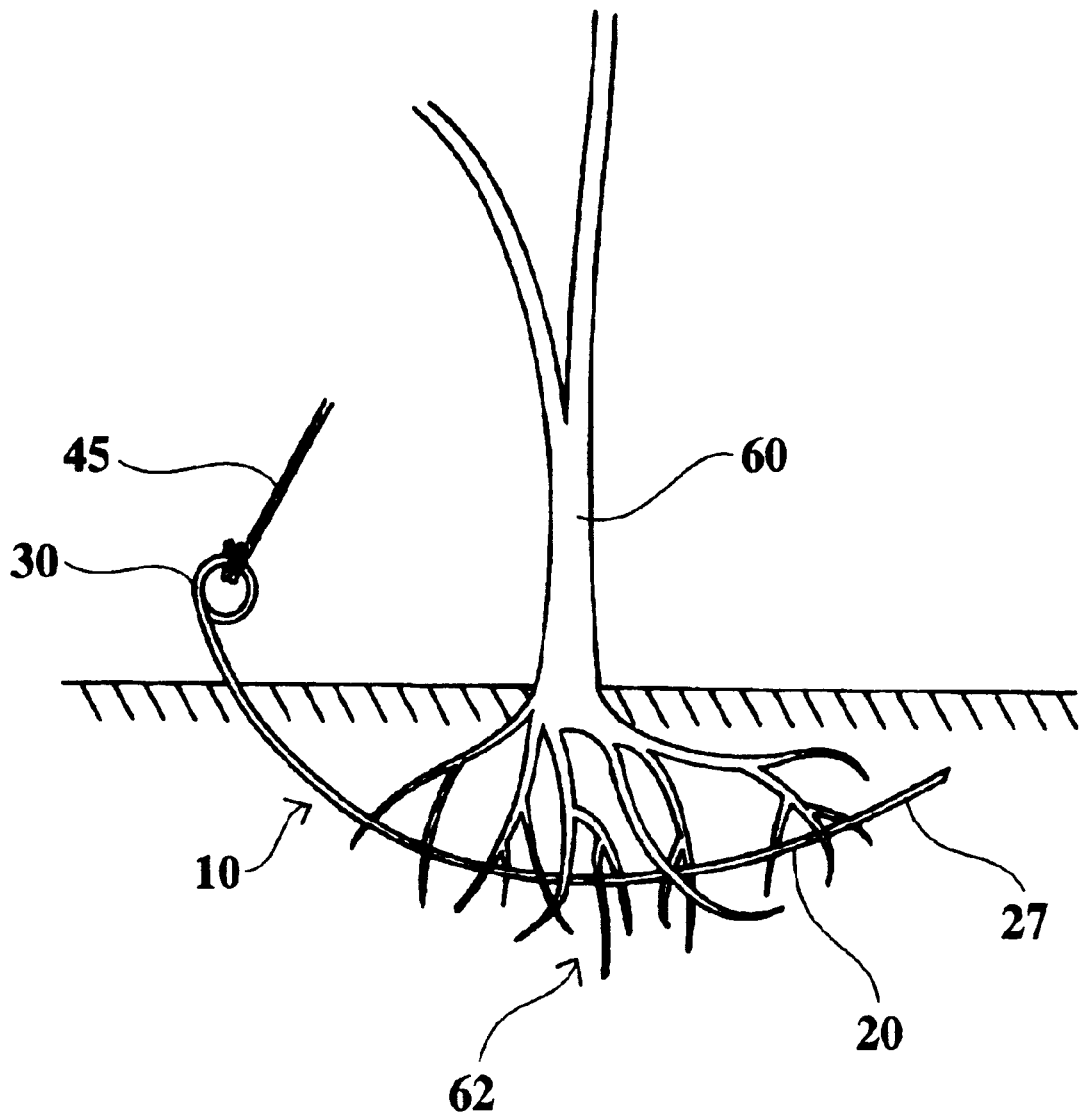
FIG. 4 is a side view of the anchor, according to an embodiment of the invention.

In the configuration shown in FIG. 4, the attachment element 30, positioned proximate the first end 25 of the picket 20, is ready to receive a trainer 45. The trainer can be any appropriate linear material selected to function as needed.

In any trainer configuration, the trainer is preferably oriented to pull with a static force upon the attachment element 30 of the anchor 10. The trainer can pull from the range of a vertical direction 50, as shown in FIG. 3, approximately perpendicular to the surface 15, to a first horizontal direction 55. The first horizontal direction is approximately toward the second end 27 of the picket 20. An intermediate direction of pull 57, between the vertical direction and the first horizontal direction, is typically the direction of pull upon the attachment element, as preferably deployed.

Alternatively, the penetrable substance 17 can be in a mounded form, such as soil formed in a planting row. In this alternative embodiment of the present invention, the mound is positioned above the arc 33 of the picket 20, while the second end 27 of the picket may penetrate back through the surface 15, exposing the second end.

Orienting the trainer 45 to pull upon the anchor 10 away from the second end 27 of the picket 20 is undesirable. The anchor withdraws from the penetrable substance 17 when it is pulled in a direction opposite the insertion direction 40. However, the removal of the anchor is easily achieved with a pull upon the anchor in reverse to the insertion direction.

The manner of anchoring the curved picket 20 into the penetrable substance 17 such as soil, is essentially achieved by increasing the averaged radius of curvature 35 of the picket when the picket is pulled, preferably in the intermediate direction 57. The pulling force of the trainer upon the attachment element 30 induces the increased arc 33 of the picket. The harder the pulling force, the more the picket bends, increasing the averaged radius of curvature as the first end 25 bends toward the second end 27. The picket with its increased averaged radius of curvature is more resistive to being pulled from the soil than a less curved picket. The easiest removal occurs when a straight picket (not shown) is pulled in the direction opposite the insertion direction 40.

In the present invention, the resistance to the anchor 10 being pulled from the penetrable substance 17 increases as a function of increasing the pulling force. The resistance increases due to the increase in the arc of the picket 20 as the anchor is pulled. The root system 62 of plants and trees surrounding the anchor can also increase the resistive strength of the anchor. Some alternative trainer 45 configurations, including anchor orientations that take advantage of root systems, are also shown in FIGS. 4 through 7.

FIG. 4 shows the anchor 10 of the present invention in a nonspecific plant 60 or tree. The second end 27 of the picket 20, as also shown in FIG. 4, includes a chiseled point 32 to aid in the insertion of the anchor into the penetrable substance 17, soil, beneath the plant. The anchor can be inserted through the root system 62 of the plant or tree, but the anchor is preferably inserted beneath the roots of a growing plant or tree, so that the root system can grow to surround the picket. This early insertion of the anchor beneath the plant or tree avoids damage to the root system by the point of the picket. Additionally, as alternatively shown in FIG. 4, the trainer 45 can simply loop through the attachment element.

Figure 5:
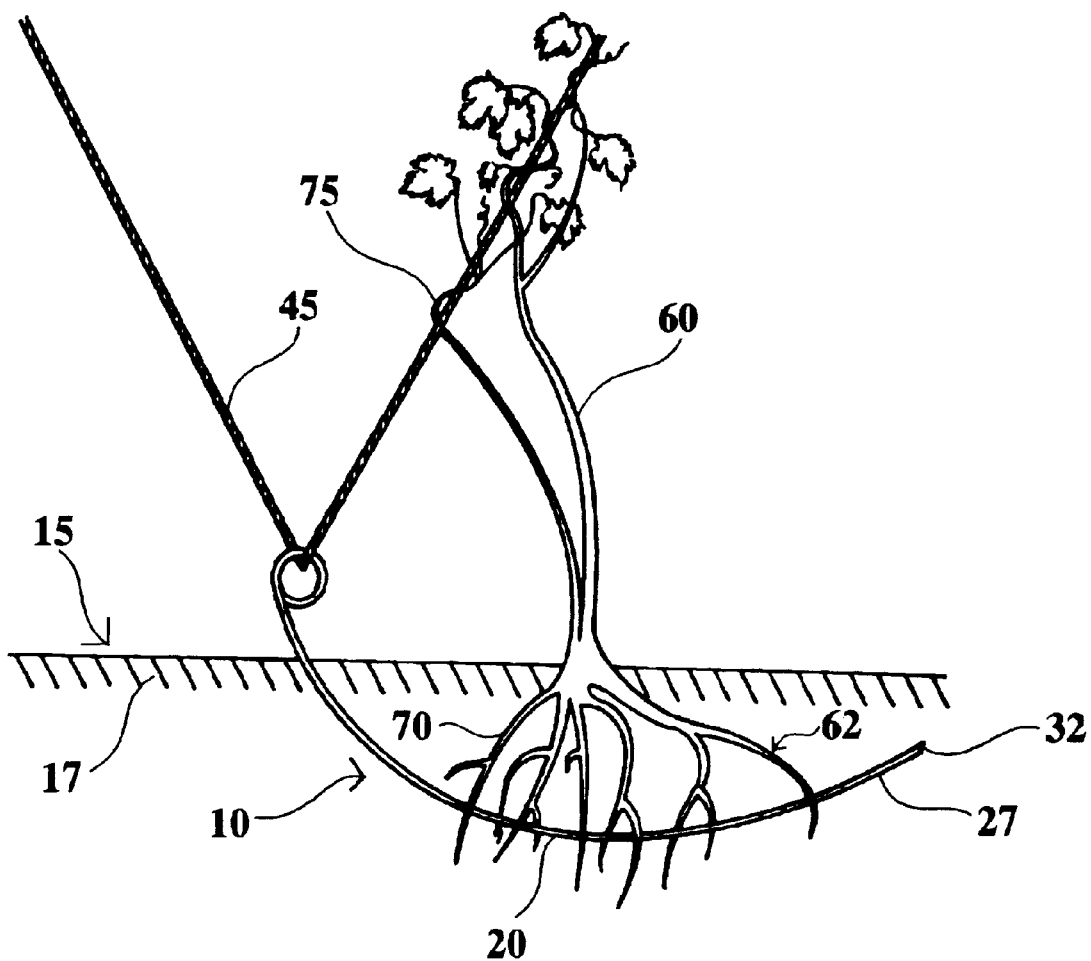
FIG. 5 is a side view of the anchor, according to a vine training embodiment of the invention.
Figure 6:
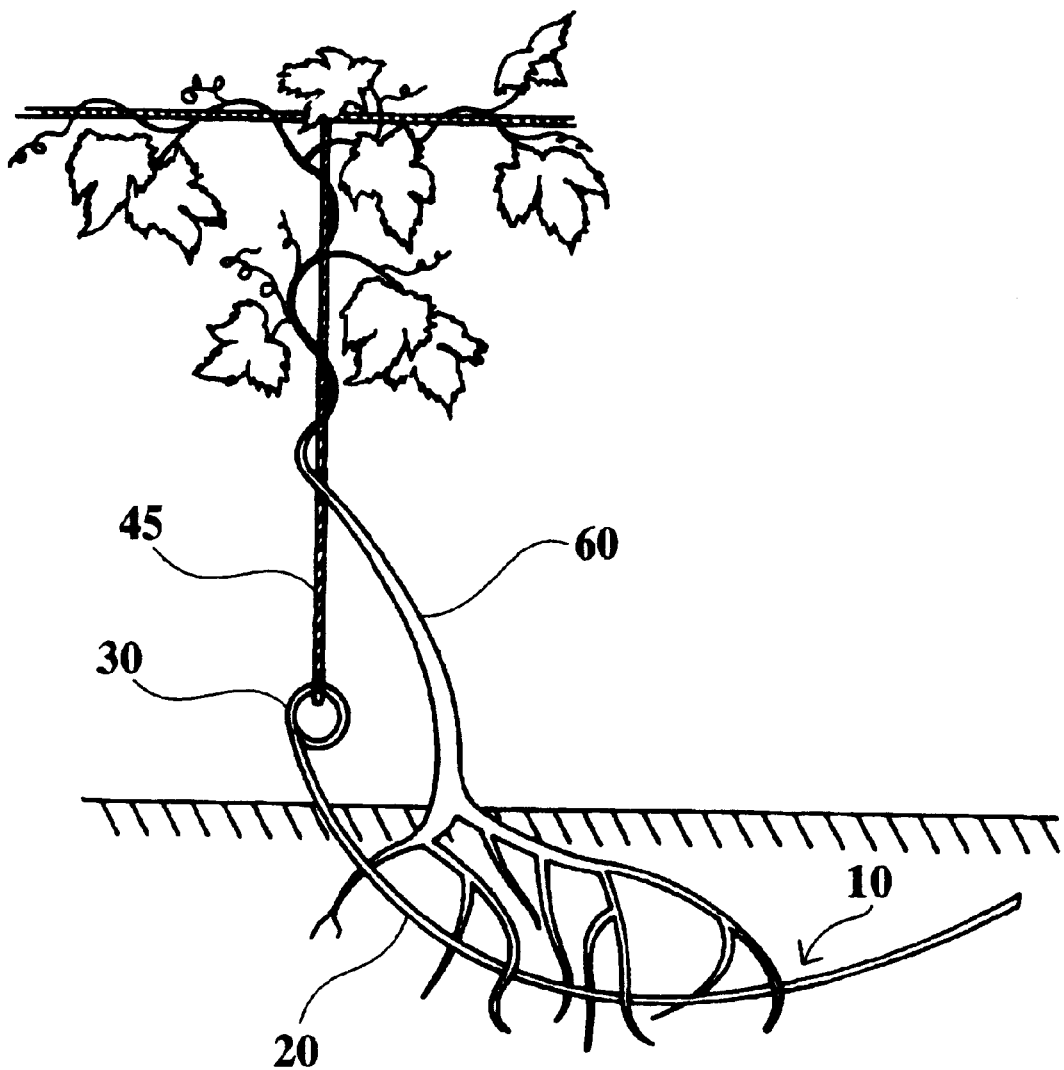
FIG. 6 is a side view of the anchor, according to an alternative vine training embodiment of the invention.
Figure 7:
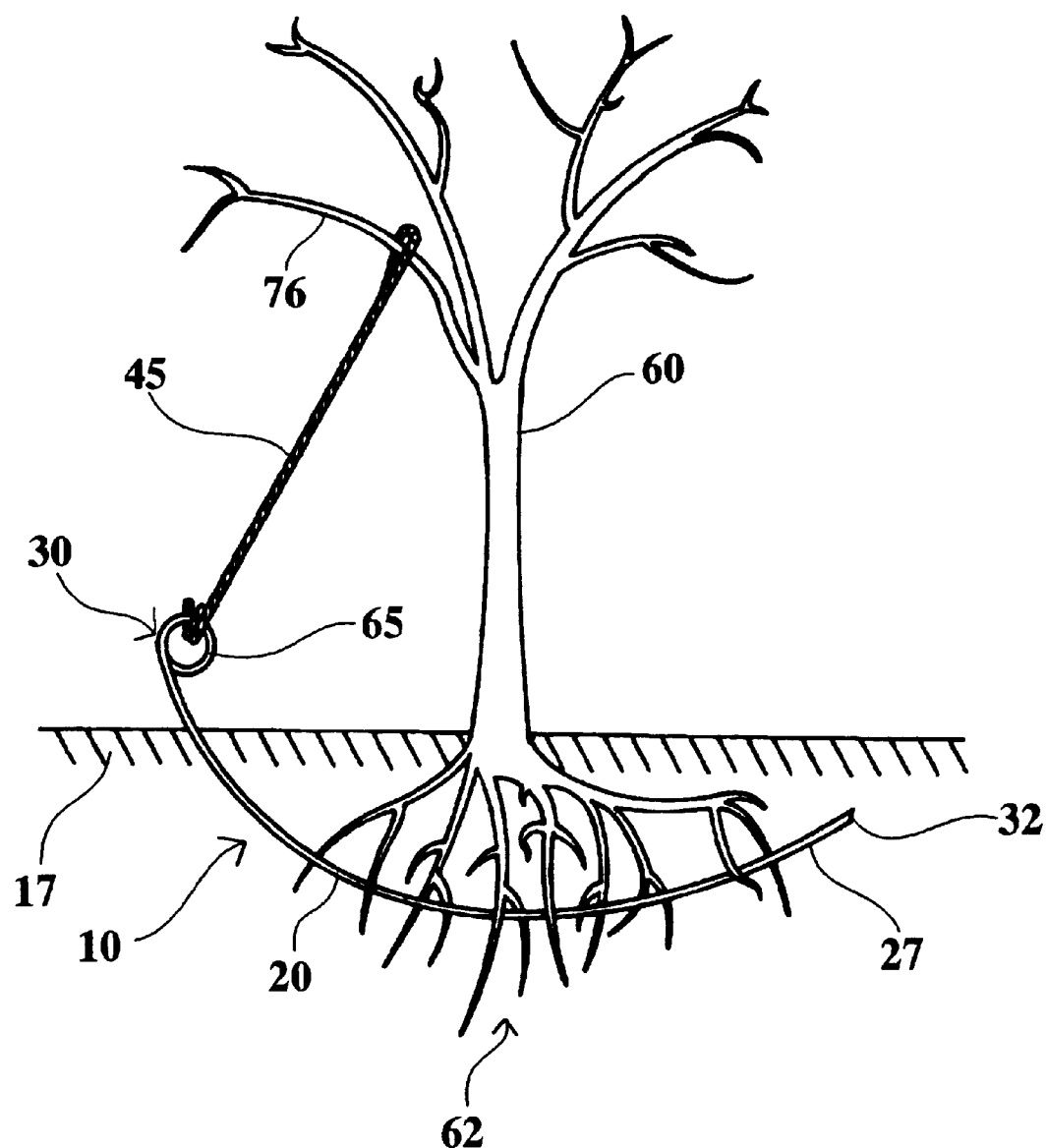
FIG. 7 is a side view of the anchor, according to a tree branch training embodiment of the invention.

The anchor 10 is versatile. It can be employed for a variety of purposes, with alternative trainer 45 configurations, as shown in FIGS. 5 through 7, and described as follows:

FIG. 5 shows the most preferred embodiment of the present invention employed as an anchor for a vined, or vineal plant. The vineal plant most preferred by the inventor for use with this embodiment of the present invention is the hop plant of the genus and species *Humulus lupulus*. In the hop plant, commonly referred to as a hop, the vertically growing vines are called bines and the predominantly horizontal vines are called laterals. In FIG. 5, the plant 60 shown is a hop with the picket 20 of the anchor 10 inserted beneath the hop and penetrating the root system 62 of the plant. Preferably, the picket of the anchor is inserted into the penetrable substance 17, which is typically soil, before the hop plant is mature enough to establish a root system that extends proximate to the picket beneath it.

This early insertion of the anchor in the soil beneath the plant 60 helps eliminate the potential of damage to the hop by the insertion of the second end 27 point 32 of the picket into a root member 70 of the hop. As the hop matures, its root members 70 surround the anchor 10 and increase the load bearing strength of the anchor. This increase in strength also coincides with growth of a bine 75 along the trainer 45 that is threaded through the attachment element 30. The bine growing up along the trainer increases the strain on the anchor, especially in windy conditions. Additional anchor strength that is required to support the growing hop's bine is provided by the hop's growing root system 62.

As previously mentioned, one loop of the wire is adequate to form the attachment element 30, although three loops are preferred as FIG. 1 specifically illustrates. The trainer 45 is easily adjustable when the trainer is first inserted between a first loop 65 and a second loop 67 of the attachment element, and then routed between the second loop and a third loop 69, as shown in FIG. 5. The second loop is the middle of the three loops of the attachment element. The first loop and the third loop clamp the trainer between, thereby holding the trainer in a desired position with the needed and variable tension on each length of the trainer twine, to and from the attachment element. The trainer is also attached easily to an overhead trainer (not shown). The overhead trainers comprise the interconnections between the poles (not shown) that are the primary supports in a conventional hop growing trellis system. The bine 75 or bine of the hop twines around and grows up the trainer.

FIG. 6 shows an alternative embodiment of the present invention, employed as an anchor 10 for a trainer 45 for a bine 75. FIG. 6 shows the vine trainer in a substantially vertical orientation, as desired for the training of a plant 60 of a vineal nature, having vines similar to grape vines. The attachment element 30 receives a trainer that can be a twine as shown or alternatively a wire, a cable or similarly performing material. The substantially vertically oriented trainer, attached to the attachment element proximate to the first end 25 of the curved picket 20, is also shown in FIG. 6. The substantially vertically oriented trainer is also attached to a substantially horizontally oriented trainer. The substantially horizontally oriented trainer is preferably attached to a post (not shown) positioned at each end of the substantially horizontal trainer. The plant, as shown in FIG. 6, naturally grows up along the trainer, with the trainer supporting its vines. The picket 20 of the anchor embodiment shown in FIG. 6 is positioned within the root system 62 of the plant for additional anchor support.

Also alternatively, as shown in FIG. 7, the anchor 10 of the present invention can be employed as a limb 76 trainer for a larger plant 60, such as a tree. The second end 27 of the picket 20 is preferably inserted into the root system 62 of a tree as shown. Positioning the picket within the root system provides additional anchoring support for the picket. A trainer 64 is then attached between the limb to be trained and the attachment element 30 of the anchor. The trainer is linear, preferably a thick length of twine or rope, although a wire could also be employed, preferably with a rubber sleeve at the tree limb or trunk. The rubber sleeve would insert between the trainer and the limb or trunk to prevent the trainer from rubbing or cutting into the bark. Similarly, the trunk of the tree could be connected to the attachment element of the anchor to brace the tree against the wind.

In an alternative embodiment of the present invention, the picket 20 can be fabricated from a flat stock (not shown) in place of the length of wire, as in the preferred embodiment. The flat stock picket can also include penetrations (not shown) therethrough for roots to enter, thereby that increasing the anchoring strength of the picket. However, when the holes are included in the picket and filled with root members 70, the ease of removing the anchor from the penetrable substance 17, preferably soil, would be significantly reduced.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible which employ the same inventive concepts as described above. Therefore, the invention is not to be limited except by the claims that follow.

What is claimed is:

1. An anchor for vineal plants comprising:
   a curved picket having a first end and a second end,
   the curved picket including a substantially smooth arc from the first end to the second end of the curved picket,
   the second end of the curved picket for penetrating into a surface of a soil, to position the first end of the curved picket above the surface of the soil, to position the second end of the curved picket beneath the surface of the soil, and to position the second end of the curved picket to point upward, toward the surface of the soil; and an attachment element positioned proximate to the first end of the curved picket, the attachment element for receiving a trainer for a vineal plant.

2. The anchor of claim 1, wherein the curved picket has an averaged radius of curvature from the first end to the second end of the curved picket, and the averaged radius of curvature is within the range of approximately three inches to approximately twenty feet.

3. The anchor of claim 1, wherein the curved picket has an averaged radius of curvature from the first end to the second end of the curved picket, and the averaged radius of curvature is within the range of approximately six inches to about three feet.

4. The anchor of claim 1, wherein the attachment element includes a trainer.

5. The anchor of claim 4, wherein the trainer includes a length of a linear material.

6. The anchor of claim 1, wherein the curved picket is formed from a length of wire.

7. The anchor of claim 1, wherein the attachment element includes at least a closed loop of wire.

8. The anchor of claim 1, wherein the attachment element includes three closed loops of wire.

9. The anchor of claim 1, wherein the curved picket penetrates into a root system of a vineal plant.

10. The anchor of claim 9, wherein the vineal plant is a hop.

* * * * *